(12) United States Patent
Perlman et al.

(10) Patent No.: US 6,173,400 B1
(45) Date of Patent: Jan. 9, 2001

(54) METHODS AND SYSTEMS FOR ESTABLISHING A SHARED SECRET USING AN AUTHENTICATION TOKEN

(75) Inventors: Radia J. Perlman, Acton; Stephen R. Hanna, Bedford, both of MA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 09/126,659

(22) Filed: Jul. 31, 1998

(51) Int. Cl.[7] .................................................... G06F 1/26
(52) U.S. Cl. ........................ 713/172; 713/168; 713/171; 713/182; 713/200; 380/255; 380/278; 380/283
(58) Field of Search .................................... 713/172, 168, 713/171, 182, 185, 200, 201; 380/255, 278, 283

(56) References Cited

U.S. PATENT DOCUMENTS

| | | | | |
|---|---|---|---|---|
| 4,924,378 | * | 5/1990 | Hershey et al. | 713/201 |
| 5,241,599 | | 8/1993 | Bellovin et al. | 380/21 |
| 5,371,692 | * | 12/1994 | Draeger et al. | 702/122 |
| 5,416,842 | * | 5/1995 | Aziz | 380/30 |
| 5,448,045 | * | 9/1995 | Clark | 235/382 |
| 5,455,953 | * | 10/1995 | Russell | 710/266 |
| 5,491,752 | * | 2/1996 | Kaufman et al. | 380/30 |
| 5,602,918 | | 2/1997 | Chen et al. | 380/21 |
| 5,892,902 | | 4/1999 | Clark | 395/187 |

FOREIGN PATENT DOCUMENTS 0 566 811 A1  10/1993  (EP) .

OTHER PUBLICATIONS

Jablon, David P., "Strong Password–Only Authenticated Key Exchange," *Computers Communication Review*, AM SIGCOMM, vol. 26, No. 5, pp. 5–26, Oct. 1996.

Kaufman, Charlie, et al., *Network Security, Private Communication in a Public World*, Prentice–Hall PTR, 1995.

\* cited by examiner

*Primary Examiner*—Thomas R. Peeso
(74) *Attorney, Agent, or Firm*—Finnegan, Henderson, Farabow, Garrett & Dunner, L.L.P.

(57) ABSTRACT

A method and system for establishing a shared secret between a plurality of devices using an authentication token. An authentication token is used to establish a shared secret between a local device and a remote device to provide user authentication, data encryption, and integrity protection. The authentication token may be used in a variety of ways to authenticate a user. First, a time-synchronized authentication token can generate a first character string that is communicated to a workstation. The workstation can manipulate the first character string to generate a second character string and send the second character string to a server. The server then compares the second character string with a plurality of possible matching character string values and determines the first character string. In another implementation, a challenge from a server can be received and processed by a challenge-response authentication token to generate a character string. The generated character string is then communicated to the workstation to establish a shared secret. A smart card may also be used to establish a shared secret between a local device and a remote device using similar techniques.

73 Claims, 15 Drawing Sheets

METHODS AND SYSTEMS FOR ESTABLISHING A SHARED SECRET USING AN AUTHENTICATION TOKEN

FIELD OF THE INVENTION

The present invention relates generally to secure communications, and more particularly, to methods and systems for establishing a shared secret between devices connected over a communication medium using an authentication token to provide user authentication, data encryption, and integrity protection.

RELATED ART

Traditionally, network users simply enter a user name and a password to gain access to network resources and other users of the network. After entering a user name and password to gain access to the network, a user usually sends and receives data in the clear during the network session without any protective measures. That is, the data is sent over a communication channel "as-is" without any level of security protection. This traditional method of gaining access to and communicating over a network presents many problems with regard to the integrity of the network.

First, a user name and password only provides a minimal level of user authentication to access the network. If the password is simple (e.g., the user's birth date) a hacker can easily determine the user's password and access the network with this information assuming the user's name. Second, sending and receiving data in the clear makes the network susceptible to eavesdroppers. An eavesdropper can intercept data sent over a network communication channel and use it for improper purposes such as hijacking the user's session. Moreover, data sent in the clear is susceptible to malicious software that can modify the data (e.g., delete or change bits) or copy the data to a hidden peripheral (e.g., copy data to a remote storage device unknown to the user).

Many users currently rely on authentication tokens to provide an additional level of user authentication based on "something you have" (versus "something you know", like a password). Authentication tokens are physical devices that people carry while passwords are simply remembered. There are a variety of authentication tokens currently available in the marketplace. These authentication tokens include time-synchronized authentication tokens, challenge-response authentication tokens, and smart cards.

A time-synchronized authentication token typically displays a different character string (i.e., password) at approximate, predetermined intervals of time (e.g., every minute). In this instance, for example, a server and token synchronize (within a predetermined tolerance) using the time of day in minutes to produce a character string (e.g., the time of day in minutes encrypted with a secret code known only to the token and the server). A user then enters the current character string displayed on the token into a workstation to authenticate the user to a server. The workstation sends the character string to the server in the clear. The server checks the character string against a list and then determines whether the character string could have been generated by the token in the last few minutes (to allow for delay in typing and transmission).

A challenge-response token is a device with a keypad, such as a card. Traditionally, when authenticating using this token, for example, the user first contacts a server which generates a challenge (e.g., a character string) and sends it to the user via a local computer. The user then enters the challenge into the token which processes the challenge and displays a response (e.g., another character string). The user sends the response to the server which checks the response against a predetermined character string value. If there is a match, the server grants the requested access.

A smart card is a device with a central processing unit (CPU) and memory. When inserted or positioned near a smart card reader, the card communicates with the reader to transfer data or perform desired functions. The smart card may have any shape. For instance, the smart card may have the shape of a credit card or a pendant worn on an article of clothing.

Any of the aforementioned authentication tokens may require an authentication code for operation. The activation code may be in the form of a personal identification number (PIN) or a biometric. For example, to operate a time-synchronized authentication token, a user may be required to enter in a character string or touch an area of the token with their thumb. With a challenge response token, an activation code may be required to activate the token before entering the challenge. Finally, certain smart cards may require a user to enter an activation code to "unlock" information stored therein (e.g., character string). Usually, after some number of wrong guesses, the card "locks" itself and will not permit access to stored information. If the information is accessible, the smart card reader can communicate it to a workstation to use for authentication purposes.

Typically, with time-synchronized authentication tokens, challenge-response authentication tokens, and smart cards, the character string values generated therein are transferred between a user's workstation and a remote computer in the clear. As a result, all communications between the user and the remote terminal become susceptible to hijackers and eavesdroppers who can easily decipher the unprotected code and intercept communicated information.

In conventional use, the only purpose for authentication tokens is user authentication. No session key—a quantity used to encrypt or decrypt information during a session—is established and therefore no integrity protection or confidentiality is provided for the session. In addition, there is no way for the client to know that it is talking to the correct server. The character string value generated by an authentication token usually contains less than 32 bits of significant information. This allows for an inexpensive display and avoids requiring users to enter long character strings. However, it makes the system more vulnerable to various attacks.

Shared secret key exchange protocols allow two computers with a shared secret to establish a stronger shared secret without risking attacks on the shared secret. The stronger shared secret may then be used to encrypt data exchanged between them. These protocols are commercially available and include the Bellovin-Merritt shared secret key exchange protocol and the Strong Password only Authentication Key Exchange (SPEKE). A description of several shared secret key exchange protocols is included in Kaufman, Perlman, and Speciner, *Network Security: Private Communication in a Public World,* Prentice Hall PTR (1995) (hereinafter "Network Security"). The Bellovin-Merritt protocol is discussed in Network Security, pp. 249–253 and described in U.S. Pat. No. 5,241,599. A discussion of SPEKE can be found in D. Jablon, "Strong Password only Authentication Key Exchange," *Computer Communication Review,* ACM SIGCOMM, vol. 26, no. 5, pp. 5–26, October 1996. Shared secret key exchange protocols strengthen password-based systems by avoiding sending the password in the clear. Currently, shared secret key exchange protocols are not used with authentication tokens to enhance session security. Therefore, there is a need for a solution that involves both authentication tokens and shared secret key exchange protocols to provide adequate user authentication, data encryption, and integrity protection.

SUMMARY OF THE INVENTION

Based on the foregoing shortcomings, it is desirable to establish a shared secret between parties communicating over a network using an authentication token to provide adequate user authentication, data encryption, and integrity protection.

Methods and systems consistent with the present invention meet the foregoing desires. Specifically, a method for establishing a shared secret among a plurality of devices, comprises the steps of providing an authentication token; and utilizing the authentication token to establish a shared secret among the plurality of devices.

A system for establishing a shared secret among a plurality of devices comprises an authentication token; a local device; and a remote device, wherein the authentication token is used to establish a shared secret between the local device and the remote device.

Additional desires, features and advantages of the invention are set forth in the following description, apparent from the description, or may be learned by practicing the invention.

Both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred embodiments of the invention and, together with the preceding general description and the following detailed description, explain the principles of the invention.

In the drawings.

DETAILED DESCRIPTION

Reference will now be made in detail to the construction and operation of preferred embodiments consistent with the present invention that are illustrated in the accompanying drawings. In those drawings, like elements and operations are designated with the same reference numbers.

Methods and systems consistent with the present invention establish a shared secret between parties communicating over a network to provide adequate mutual authentication, data encryption, and integrity protection. This is accomplished in a variety of ways as explained in detail below. In one embodiment, for example, a shared secret can be established using an authentication token that generates a character string and is approximately time-synchronized with a remote device (e.g., server). The character string, for example, is a password based on the time of day encrypted with a secret code or a random number. The character string is communicated to a local device (e.g., workstation) where it can be modified using a predetermined function to produce a result (i.e., a second character string). The result is sent to the remote device. Once received, the remote device compares the result with a finite number of possible matching character string values relating to the initial character string generated by the authentication token. The remote device and the user's local device can then share the matching value or a function of the matching value as a secret to encrypt and enhance the integrity of information transferred therebetween, and/or perform mutual authentication. Alternatively, the remote and local devices may use their shared secret to establish a larger (and thus more secure) secret, which may be used to encrypt data, enhance the integrity of information transferred therebetween, and/or perform mutual authentication.

Figure 1:
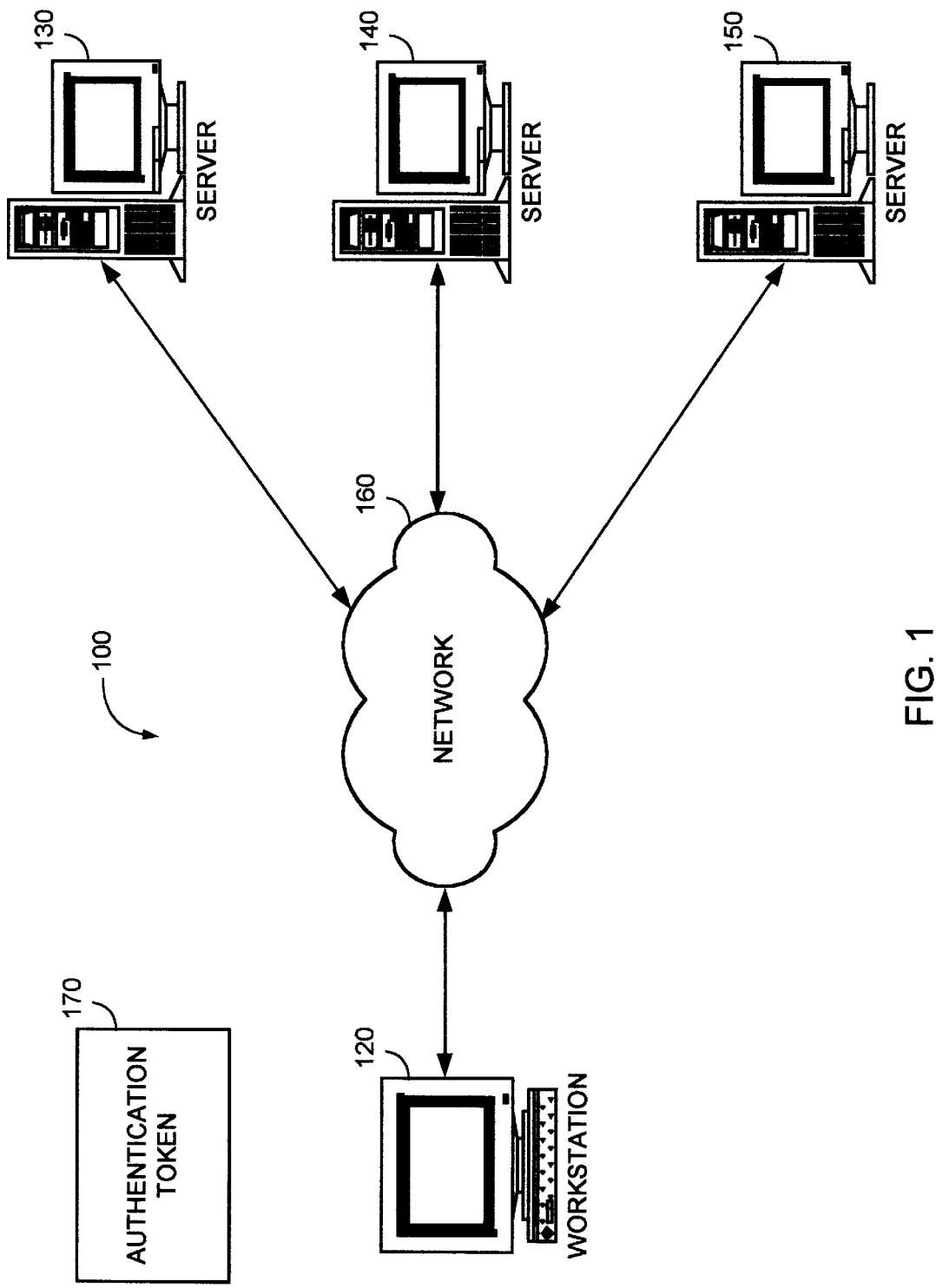
FIG. 1 illustrates a system for establishing a shared secret using an authentication token consistent with the present invention.

FIG. 1 illustrates a system 100 for establishing a shared secret using an authentication token consistent with the present invention. System 100 includes a workstation 120, servers 130, 140, and 150, a network 160, and an authentication token 170. One skilled in the art will appreciate that system 100 may include an unlimited amount of workstations, servers, and other network components.

Workstation 120 is a computer capable of sending data to and receiving data from network 160. Workstation 120 includes a processor, memory, and input/output devices to facilitate human interaction (not shown). Workstation 120 includes software for implementing the authentication techniques described herein, such as encryption software. Moreover, workstation 120 includes a modem (not shown) or other communications device to transfer data over network 160. One skilled in the art will appreciate that workstation 120 may have any configuration consistent with the embodiments described herein. For example, workstation 120 may rely on software stored in an external memory to implement the described authentication techniques.

Servers 130, 140, and 150 are included in FIG. 1 to illustrate the ability of workstation 120 to communicate with a plurality of network devices for authentication purposes. Each server is a computer capable of sending data to and receiving data from network 160. Each server can be configured for different applications and controlled by different entities. For example, a bank may operate server 130 to allow remote access to customer financial data and a service-oriented company may operate server 140 to permit remote access to customer account information. In addition, a manufacturing company may operate server 150 to facilitate customer access to order status information. Each of these servers can store and control access to privileged information. To this end, one or more authentication techniques as described herein are used to ensure that only intended parties receive the privileged information.

Network 160 is a communication medium, such as the Internet, that routes information between devices connected thereto. Although FIG. 1 shows computers connected to network 160, other components with communication capabilities may be connected to network 160 as well. For simplicity, network 160 is often referred to herein as the Internet to illustrate how authentication tokens are used to authenticate users of the Internet. Nevertheless, authentication techniques consistent with the present invention may be used on other WANs as well as local area networks (LANs), network protocols, and other communication media.

Authentication token 170 may include input (e.g., keypad, light pen, etc.) and output capabilities (e.g., LCD display, speaker, etc.). The input capabilities allow information, such as character strings, to be communicated to authentication token 170. The output capabilities allow information to be communicated to a user or another device. Authentication token may be time-synchronized with a remote device (i.e., time-synchronized token), configured to process character strings entered on its keypad to produce a response (i.e., challenge-response token), or designed to store information accessible only through an appropriate reader device (i.e., smart card). To facilitate these operations, authentication token 170 preferably includes a processor and a memory (not shown). In addition, authentication token 170 may be configured to require an activation code (e.g., PIN or biometric) for operation. Although authentication token 170 may or may not be physically connected to workstation 120, it is included in system 100 to implement authentication techniques described in detail below.

Figure 2:
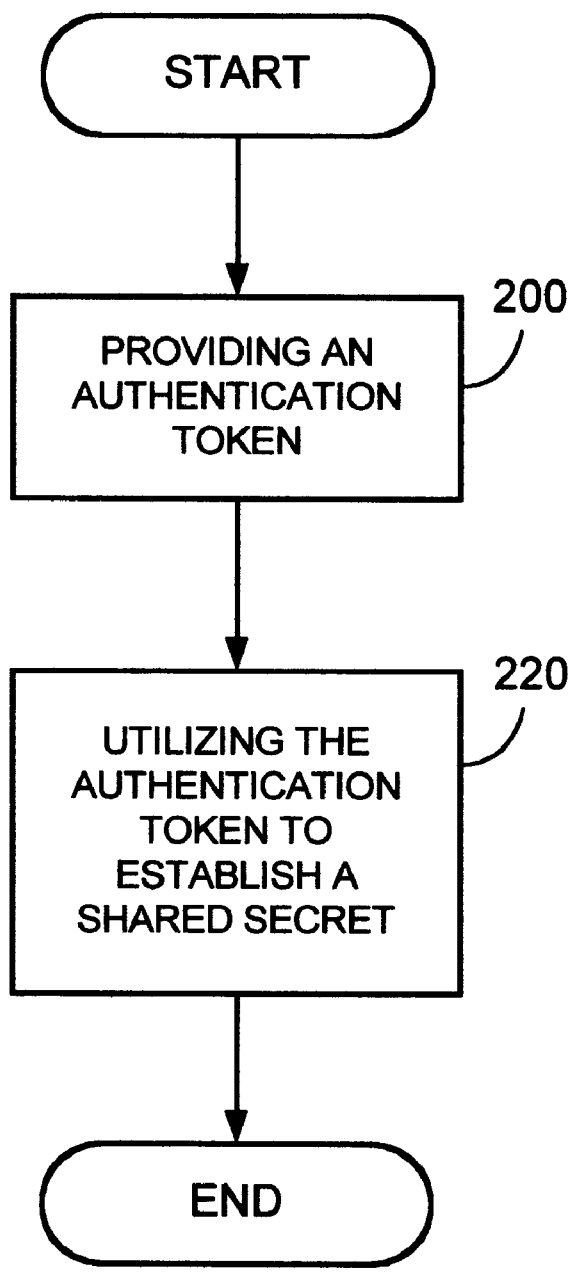
FIG. 2 illustrates a method for establishing a shared secret using an authentication token consistent with the present invention.

FIG. 2 illustrates a method for establishing a shared secret using an authentication token consistent with the present invention. The method begins with providing an authentication token (step 200). The authentication token can be a time-synchronized token, challenge response token, or any token configured to implement the authentication techniques described herein. The authentication token is then utilized to establish a shared secret (step 220). Authentication techniques for establishing a shared secret are described below with respect to FIGS. 3–8.

Figure 3A:
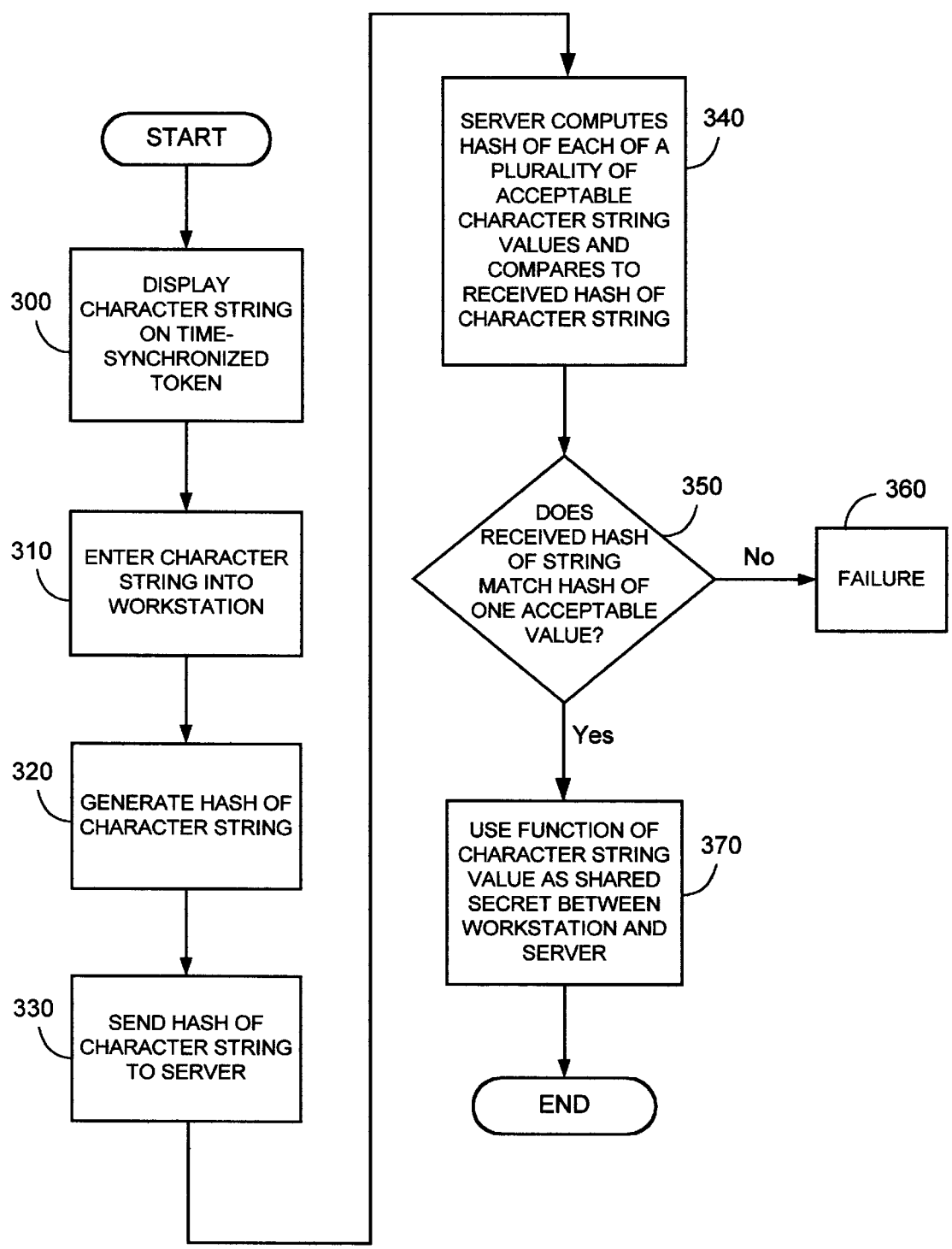
FIG. 3a illustrates a method for establishing a shared secret using a time-synchronized authentication token and a hash function consistent with the present invention.

FIG. 3a illustrates a method for establishing a shared secret using a time-synchronized authentication token and a hash function consistent with the present invention. Traditionally, a user enters a character string into a workstation which transmits the character string to a server in the clear. Implementations consistent with the present invention do not send the character string in the clear. Rather, these implementations use the character string displayed on the authentication token to generate a shared secret between communicating parties to provide a reasonable level of authentication and a secure session.

First, a character string is generated on a time-synchronized token 170 (step 300). Preferably, the character string is the time of day in minutes encrypted with a secret code known only to the token and the server. The character string is then communicated to workstation 120 (step 310). For example, the user can read the character string and manually enter it into the workstation, or, if connected, the workstation can read the character string automatically from the authentication token. Upon receiving the character string, the workstation executes a commercially available hash program to generate a hash of the character string (i.e., h(character string)) (step 320). A hash is a cryptographic one-way function that takes an arbitrary-sized input and yields a fixed-sized output. The workstation then sends h(character string) to server 130 (step 330).

To allow for clock skew and delays in typing and transmission, the server will accept any one of several character strings, based on character strings the token might have displayed in the last seven minutes or the next three minutes (or other suitable values for the number of minutes). Because the number of acceptable character strings is small, it is easy for the server to compute the hash of each acceptable character string and disambiguate a matching hash from the computed hashes by comparing each hash to the hash received, h(character string) (steps 340 and 350). If a match is not found, the authentication attempt fails (step 360). If a match is found, the server and workstation use a function of the character string (e.g., a hash of the character string, the character string itself, or other variations) as a shared secret (step 370). That is, the server and workstation use a function of the matched character string to encrypt messages sent therebetween over network 160. This technique is effective provided that the matched character string has enough bits to protect against eavesdroppers. In most types of tokens, the character strings generated are too short (such as only $2^{32}$ possible values). However, if the character string is too short, an eavesdropper that captures h(character string) can determine the character string through an exhaustive search.

Figure 3B:
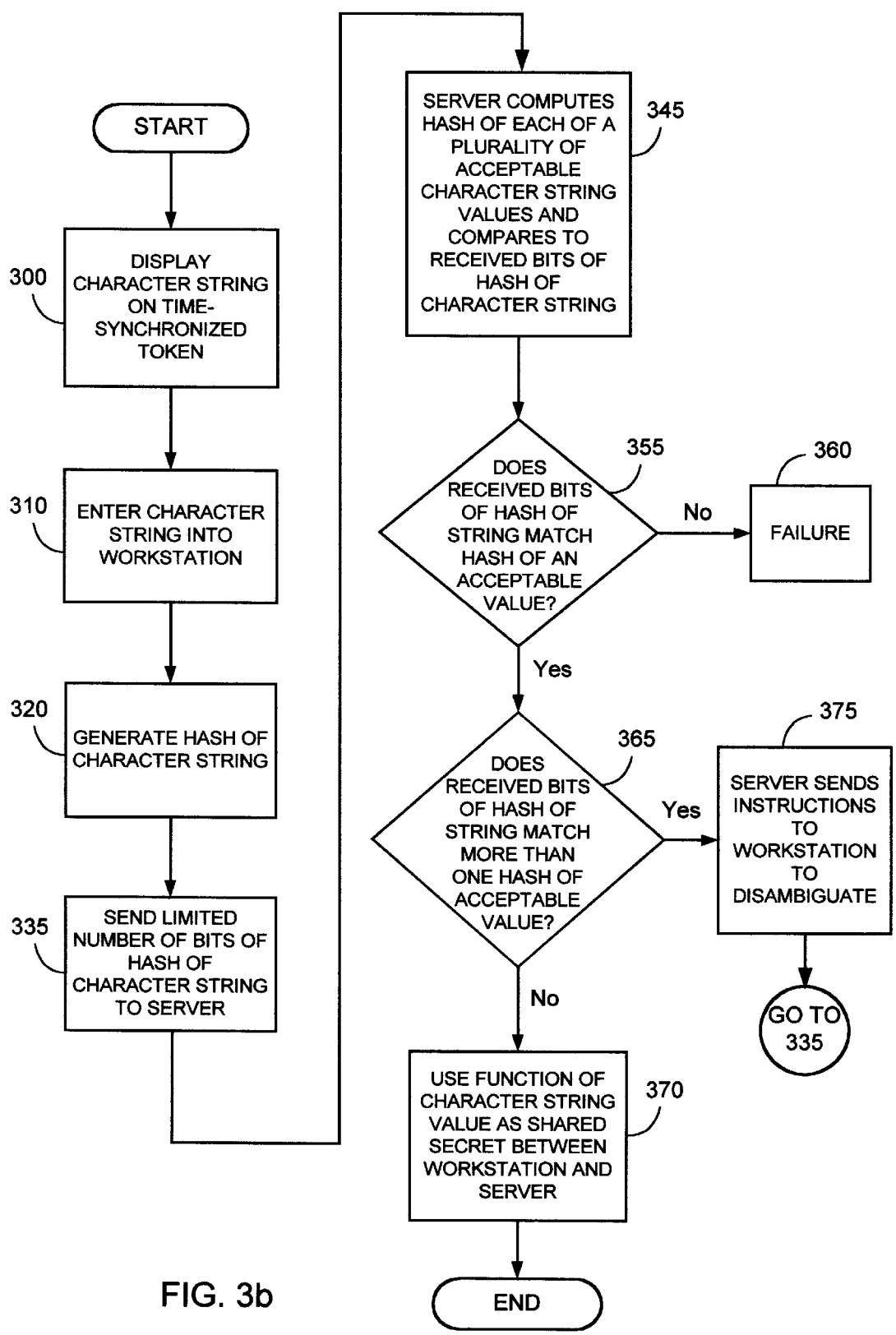
FIG. 3b illustrates a method for establishing a shared secret using a time-synchronized authentication token, a hash function, and a limited number of character string bits consistent with the present invention.

FIG. 3b illustrates an implementation consistent with the present invention similar to that illustrated in FIG. 3a. This implementation includes steps 300–320 of FIG. 3a. Nevertheless, instead of sending a complete hash of the character string to the server, as shown in step 330 of FIG. 3a, the implementation of FIG. 3b sends only a few bits of the hashed the character string to the server (e.g., 12 bits of a 64-bit hash of the character string) (step 335). The purpose of sending a hash of the character string to the server is for server 130 to determine the correct character string from the ten or so acceptable character strings (i.e., assuming the clock skew is such that only ten character strings are needed to determine the character string). Since server 130 needs only to distinguish between a small number of character strings, a few bits of the hashed character string will, with high probability, allow server 130 to compute a hash character string that will not collide with any of the remaining nine character strings.

The purpose of sending only a few bits of the hashed character string rather than a complete message digest is to foil an eavesdropper's efforts to narrow down the character string from the number of possibilities the eavesdropper must search (i.e., $2^{64}$). For example, if workstation 120 sends an eight-bit hash, approximately $2^{56}$ character strings will match that hash, and the eavesdropper has to search $2^{56}$ values to determine the correct character string.

If the workstation sends an eight-bit hash character string and the original character string has 64 bits of randomness, the probability that two or more of the ten character strings will match the hash of the character string entered by the user is $1—(255/256)^9$ or approximately 4%. If it is unacceptable for approximately one in 40 authentication attempts to fail (because one of the nine other character strings hashes to the same character string as the original character string and the server guesses the wrong one), then the workstation can send a 16-bit hash, which still leaves the eavesdropper with $2^{48}$ values to search.

After receiving only a few bits of the hash of the character string, the server computes a hash of each of a plurality of acceptable character string values and compares the computed hash to the received bits (step 345). Based on the comparison, the server determines whether the received bits match an acceptable character string value (step 355). If there are no matches between the computed hash and received bits, the authentication attempt fails (step 360). If a match is found, the server determines whether the received bits match more than one acceptable value (step 365). If there is only one match, the server and workstation use a function of the character string (e.g., a hash of the character string, the character string itself, or other variations) as a shared secret (step 370). If more than one match is found, the server sends instructions to the workstation to disambiguate the hash of the character string (step 375). In this instance, a single matching acceptable value is determined while communicating as little information as possible, a technique that is described in detail below.

Failed authentication attempts can be avoided by having the server notice that more than one of its predetermined character strings match the received hash, and request additional bits in the hash. Since the server knows all of the possible matching character strings, it can request specific bits in the hash that it knows will differentiate the collided character strings (i.e., by sending an instruction to the workstation for the necessary bits). Another option is for the server to request the "next k bits." Requesting specific bits allows the server to receive the fewest possible bits needed to determine the original character string held by the workstation.

An additional alternative to the foregoing techniques is for the workstation not to send any bits of the hashed character string to the server initially, but rather have the server check the ten predetermined character strings and request the minimum number of bits that will differentiate those ten character strings. This technique can be further modified such that the server computes a constant that, when hashed with each of the collided predetermined character strings, will yield a different hash. The server then sends the constant to the workstation and requests the resulting hash. The workstation then applies a function to hash the constant with the character string (i.e., (character string/constant)) and sends the combined hash character string to the server to match with one of the predetermined character strings. From the matching character string, the server can compute the original character string and use it as a shared secret with the workstation. In using the foregoing authentication techniques, a user should be sure that the combined information (i.e., hash of character string and constant) does not provide an eavesdropper with enough information to determine the character string.

Another implementation of determining matching acceptable values (i.e., disambiguating) is for the server to send a value to the workstation (e.g., after receiving a few bits of a hash of a character string concatenated with a PIN). Using a function known to the server, the workstation generates an output value that represents a function of the original value (sent from the server) and the character string (from the authentication token) concatenated with a PIN. The resulting output value is sent to the server and used to determine a single matching acceptable value.

Once a shared secret has been established, the server and the workstation can easily perform mutual authentication, if desired, with any of a number of well-known techniques for performing mutual authentication based on a shared secret. These techniques are described in *Network Security*, page 223. For instance, the server can implement a method to prove that the workstation has the shared secret. This method begins with communicating a second character string from the server to the workstation, which implements a function using the shared secret and/or the second character string (such as a hash of the secret and the second character string) to produce an output. The workstation then sends the output to the server which compares the output to the expected value to prove that the local device has the shared secret. This process can easily be reversed to allow the workstation to authenticate the server.

It is desirable that the server prove knowledge of the character string (or a small set of acceptable character strings) before the workstation reveals information used to determine the character string. Otherwise, a man in the middle or imposter server can play along in the protocol and then use an exhaustive search to find the correct value and continue the session. This recommendation applies to each embodiment consistent with the present invention.

Figure 4A:
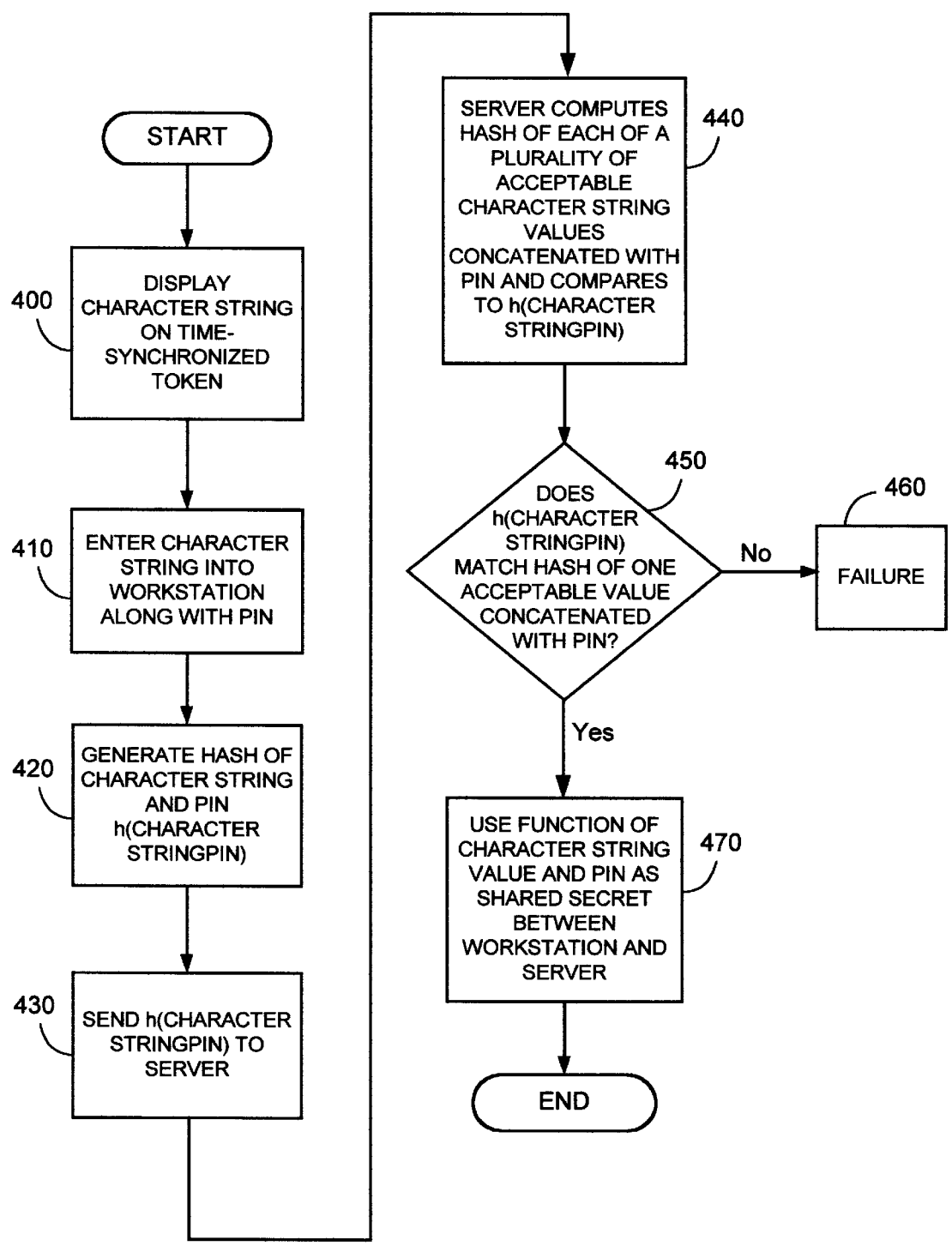
FIG. 4a illustrates a method for establishing a shared secret using a time-synchronized authentication token, a hash function and a PIN consistent with the present invention.

FIG. 4a illustrates a method for establishing a shared secret using a time-synchronized authentication token, a hash function and a PIN consistent with the present invention. This method avoids the problem of exhaustive search when the character strings generated by the token are too short.

First, a character string is generated on a time-synchronized token 170 (step 400). The character string is then communicated to workstation 120 along with a PIN (step 410). For example, the user can read the character string and manually enter it into the workstation with a PIN, or, if connected, the workstation can read the character string automatically from the authentication token after the user has entered a PIN into the workstation. Upon receiving the character string, the workstation executes a commercially available hash program to generate a hash of the character string and the PIN (i.e., h(character string/PIN)) (step 420). The workstation then sends h(character string/PIN) to server 130 (step 430). Server 130 then computes h(character string/

PIN) for each of a plurality of acceptable character strings using the PIN which is already known to the server and compares the acceptable character strings with h(character string/PIN) received from workstation 120 (step 440 and 450). If a match is not found, the authentication attempt fails (step 460). If a match is found, the server and workstation use a function of the character string and the PIN (e.g., a hash of the character string concatenated with a PIN concatenated with a constant) as a shared secret (step 470).

Figure 4B:
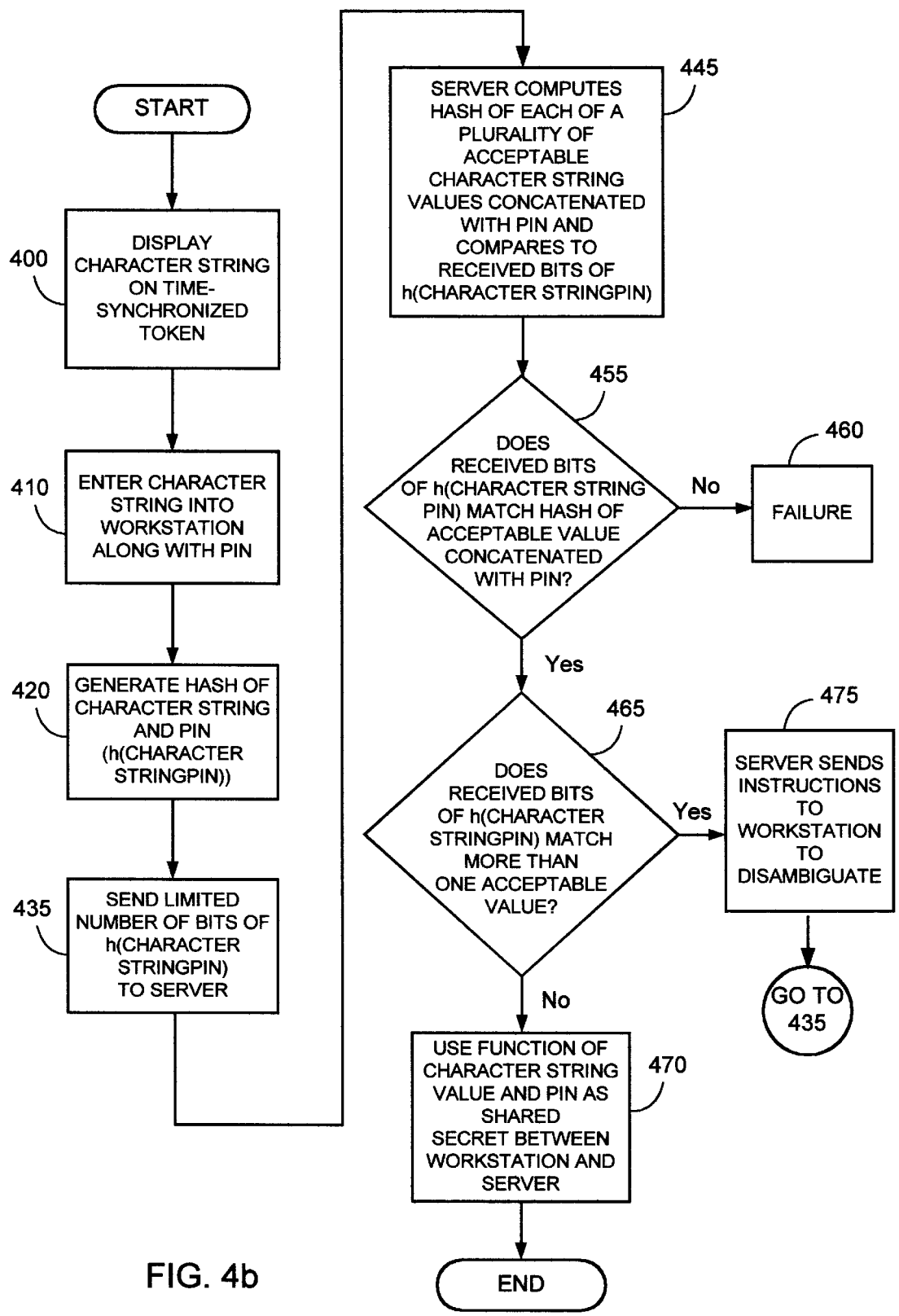
FIG. 4b illustrates a method for establishing a shared secret using a time-synchronized authentication token, a hash function, a PIN, and a limited number of character string bits consistent with the present invention.

FIG. 4b illustrates an implementation consistent with the present invention similar to that described above with reference to FIG. 4a. This implementation shares steps 400–420 of FIG. 4a, however, differs thereafter by sending only a limited number of bits of h(character string/PIN) to the server (step 435). After receiving only a few bits of h(character string/PIN), the server computes a hash of each of a plurality of acceptable character string values concatenated with the PIN and compares the computed hash to the received bits (step 445). Based on the comparison, the server determines whether the received bits match an acceptable character string value (step 455). If there are no matches between the computed hash and received bits, the authentication attempt fails (step 460). If a match is found, the server determines whether the received bits match more than one acceptable value (step 465). If there is only one match, the server and workstation use a function of the character string (e.g., a hash of the character string concatenated with a PIN concatenated with a constant) as a shared secret (step 470). If more than one match is found, the server sends instructions to the workstation to disambiguate the hash of the character string concatenated with a PIN (step 475). A single matching acceptable value is determined by using just enough bits of the hash of the character string. This can be accomplished by using one or more of the techniques described above with respect to FIG. 3b.

In the aforementioned embodiment, the shared secret between the workstation and the server is a different function than h(character string/PIN). For instance, the hash character string sent from the workstation to the server might be SHA(character string/PIN) and the shared secret might be SHA(character string/PIN/constant) with the constant being previously known to the workstation and server. (SHA stands for "secure hash algorithm" which is a message digest function proposed by the National Institute of Standards and Technology (NIST)). This authentication technique works effectively with all time-synchronized tokens, provided that the PIN and the character string together include enough bits (e.g., 64-bits or more) to thwart an exhaustive search from an eavesdropper.

Figure 5A:
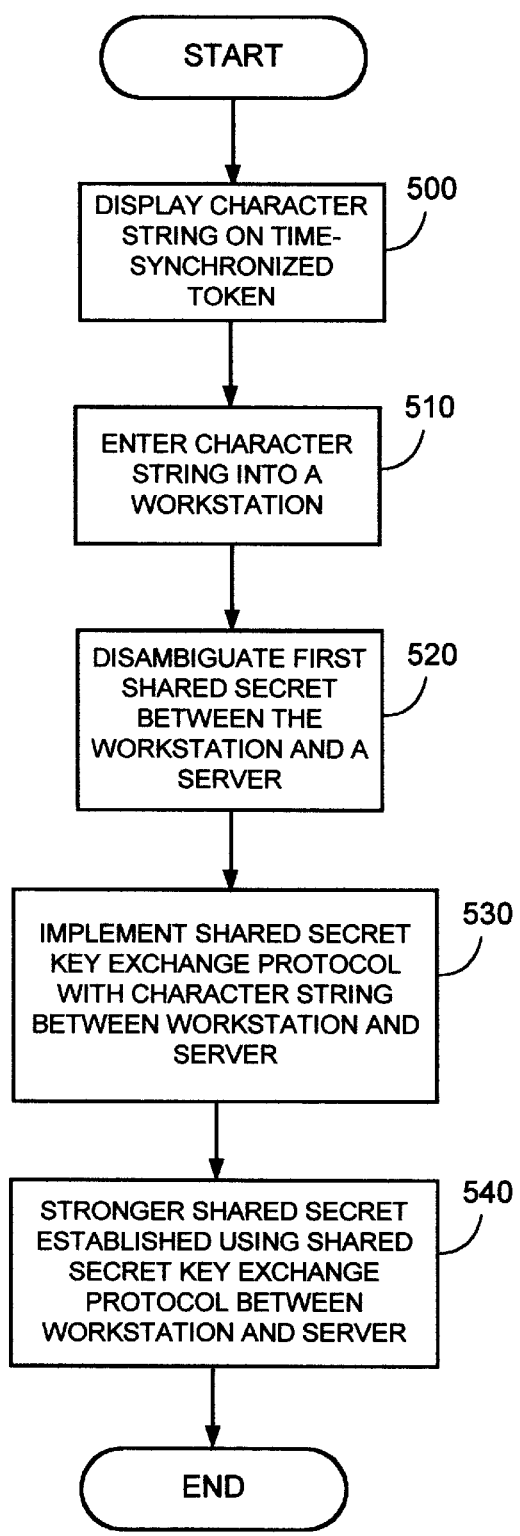
FIG. 5a illustrates a method for establishing a shared secret using a time-synchronized authentication token and a shared secret key exchange protocol consistent with the present invention.
Figure 5B:
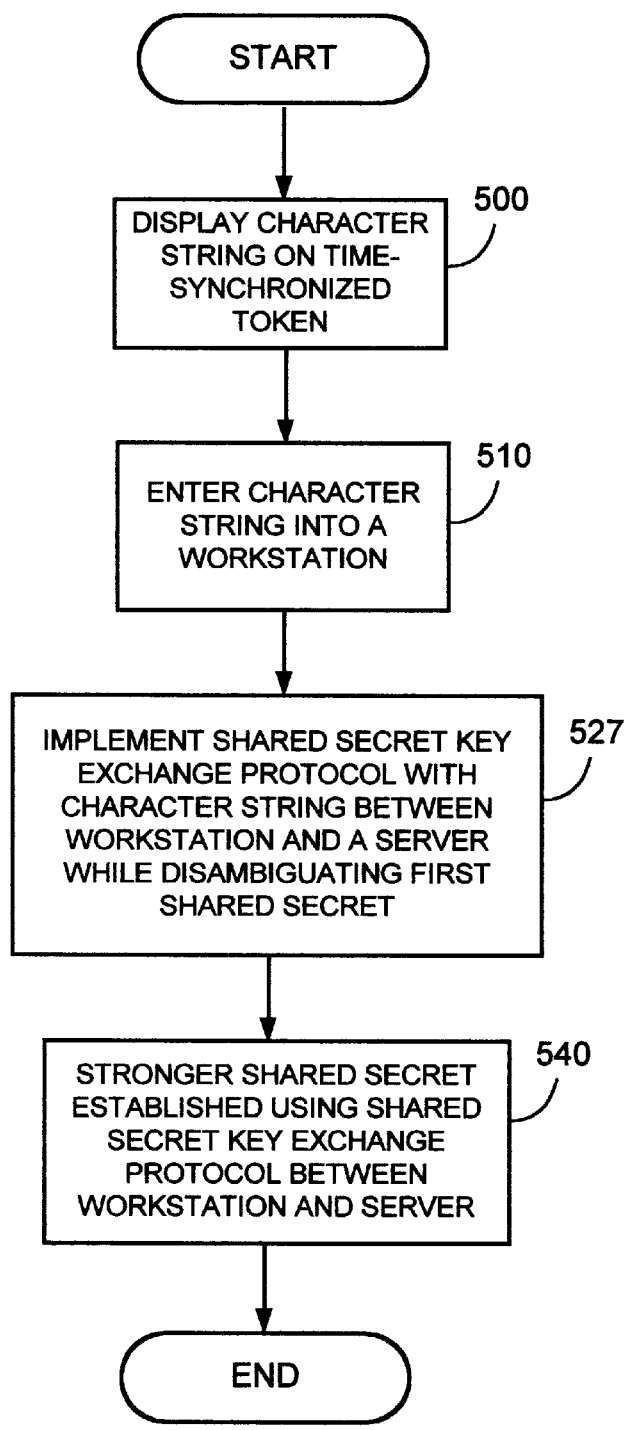
FIG. 5b illustrates a method for establishing a shared secret using a time-synchronized authentication token and a shared secret key exchange protocol consistent with an alternative implementation of the present invention.
Figure 5C:
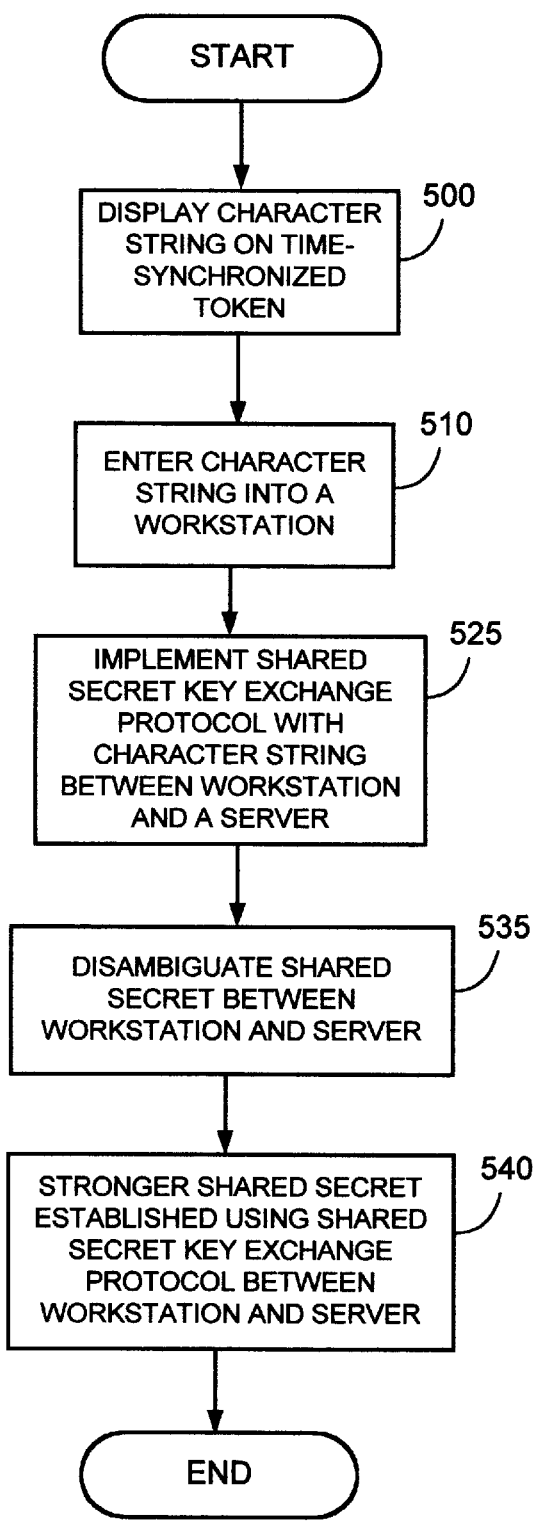
FIG. 5c illustrates a method for establishing a shared secret using a time-synchronized authentication token and a shared secret key exchange protocol consistent with yet another alternative implementation of the present invention.

FIGS. 5a–5c illustrate a method for establishing a shared secret using a time-synchronized authentication token and a shared secret key exchange protocol consistent with the present invention. In this implementation, the secret (e.g., character string) shared between the workstation and server can be disambiguated either before implementing a shared secret key exchange protocol, while implementing a shared secret key exchange protocol, or after implementing a shared secret key exchange protocol.

FIG. 5a illustrates a method of disambiguating a shared secret before implementing a shared secret key exchange protocol. This method begins with displaying a character string on a time-synchronized token 170 (step 500). The user then enters the character string into workstation 120 (step 510). The workstation and server use the character string to establish a first shared secret, as described in any of the foregoing embodiments (step 520). Subsequently, the first shared secret can be used to establish a stronger shared secret (e.g., a shared secret having more bits) using a shared secret key exchange protocol, such as the Bellovin-Merritt shared secret key exchange protocol (step 530). Once the stronger shared secret has been established, it may be used to encrypt traffic or perform other operations (step 540).

FIG. 5b illustrates a method of disambiguating a shared secret while implementing a shared secret key exchange protocol. This method is similar to that illustrated in FIG. 5a, except that steps 520 and 530 are combined in FIG. 5b (step 527). Several techniques allow a first shared secret to be disambiguated while implementing a shared secret key exchange protocol. One such technique is to use the Bellovin-Merritt shared secret key exchange protocol and have workstation 120 concatenate a constant into the first encrypted message of the shared secret key exchange protocol and have server 130 check that the decrypted message includes the constant. Another is to have workstation 120 concatenate some or all of the hash of the character string from the authentication token into the message before encryption and have server 130 check that the decrypted message includes the proper hash bits. A further technique is to have workstation 120 send some or all of the bits of the hash of the character string unencrypted along with the encrypted message.

Alternatively, as illustrated in FIG. 5c, the shared secret key exchange protocol may be implemented using the character string from the authentication token (step 525) as a first shared secret without first disambiguating it. Subsequently, the character string can be disambiguated (step 535), thus determining the stronger shared secret established by the shared secret key exchange protocol (step 540).

For instance, a modified Bellovin-Merritt shared secret key exchange protocol may be implemented such that the server receives a first message encrypted with the character string from the workstation, chooses its part of the key, computes several values for the complete key based on the several acceptable values for the character string, and sends hashes of the complete keys along with its part of the key (unencrypted) to the workstation. The workstation can then determine the complete key and compare its hash to those received from the server. If there is a match, the server determined the character string (within a small set). At this point, the workstation may prove that it has the character string or second shared key via a challenge-response (where the challenge may optionally have been sent with the previous message from the server).

The foregoing techniques may be employed to establish the shared secret or avoid failed authentication attempts while minimizing the number of hash bits sent (e.g., such as having the server request more bits or send a constant that should be included in the hash to avoid collisions). The character string used as the basis for the shared secret key exchange protocol should be over 32 bits in length. If not, a PIN may be added to the character string before implementing the protocol to provide enhanced authentication.

Figure 6:
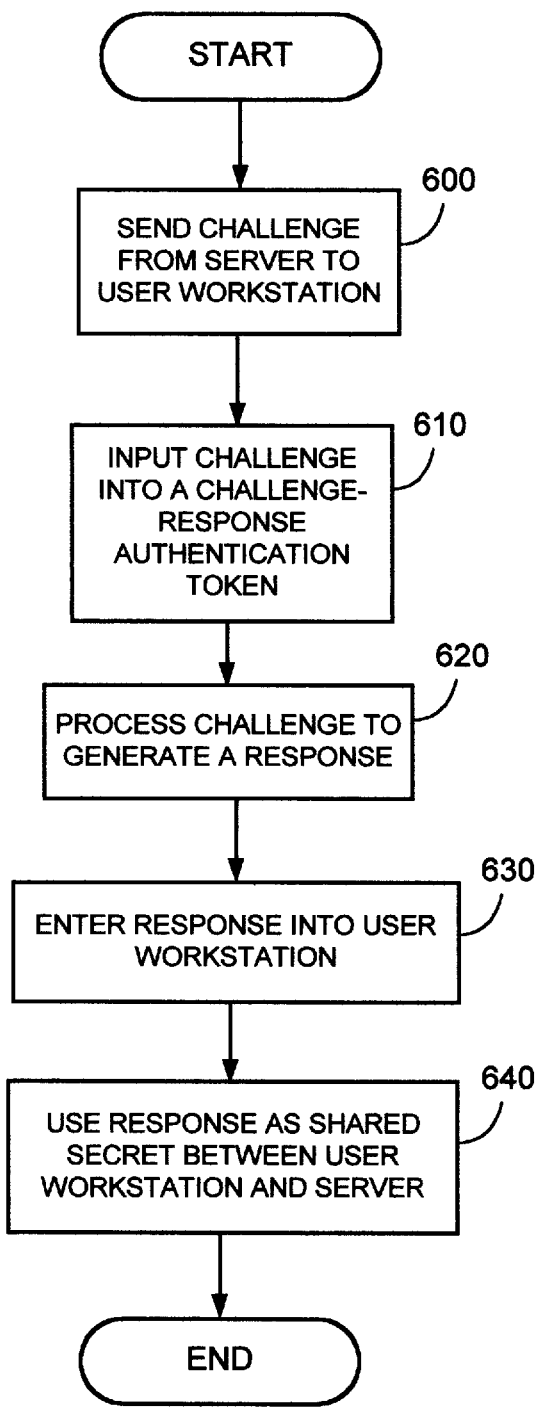
FIG. 6 illustrates a method for establishing a shared secret using a challenge-response authentication token consistent with the present invention.

FIG. 6 illustrates a method for establishing a shared secret with a challenge-response authentication token consistent with the present invention. The method begins with server 130 sending a challenge (i.e., string of characters) to workstation 120 (step 600). Upon receipt, the user enters the challenge into a challenge-response authentication token (step 610). The authentication token processes the entered challenge and generates a response (step 620). The generated response is then communicated to workstation 120 (step 630) where it is used as a shared secret between the workstation and the server (step 640). This authentication technique provides a high level of authentication between the workstation and the server as long as the length of the response is sufficient (e.g., over 32-bits in length). If not, the modification of this embodiment may be used to increase the level of authentication as described below with respect to FIG. 7.

Figure 7:
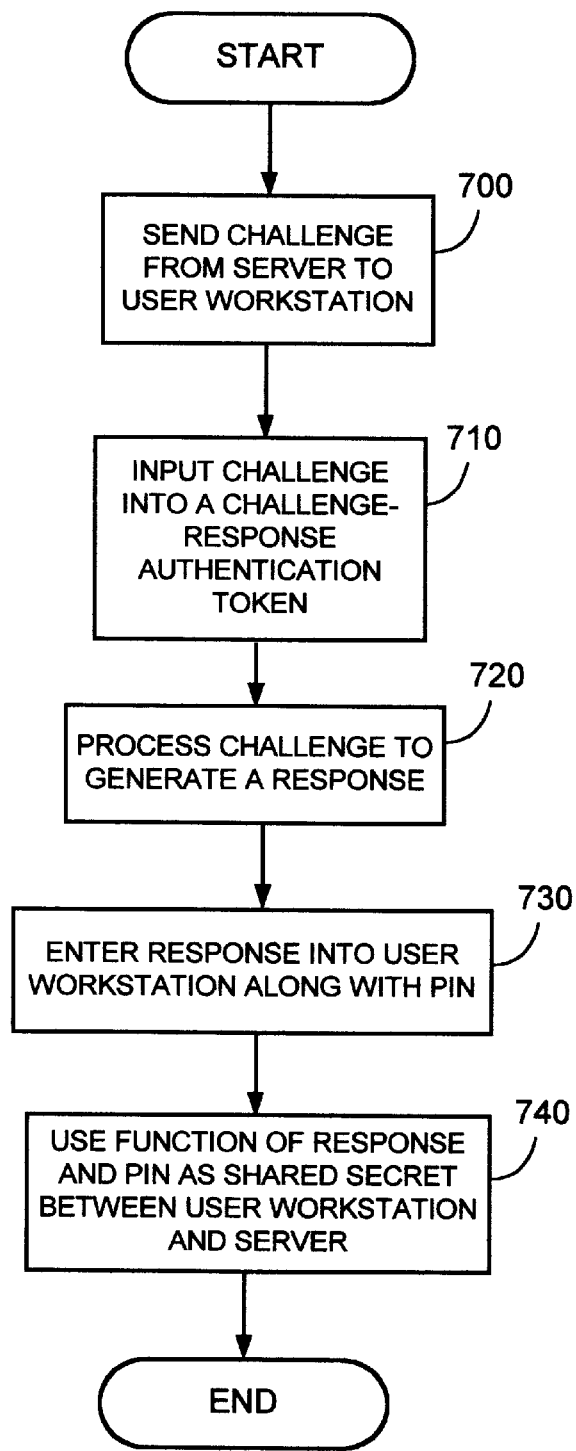
FIG. 7 illustrates a method for establishing a shared secret using a challenge-response authentication token and a PIN consistent with the present invention.

FIG. 7 illustrates a method for establishing a shared secret with a challenge-response authentication token and a PIN consistent with the present invention. This method begins with server 130 sending a challenge to workstation 120 (step 700). Upon receipt, the user enters the challenge into a challenge-response authentication token (step 710). The authentication token processes the entered challenge and generates a response (step 720). The user then enters the generated response into workstation 120 along with a PIN (step 730). Finally, workstation 120 and server 130 can use a function of the response and PIN as a shared secret (step 740). This embodiment provides a high level of authentication when the response and PIN are long enough for a session key (e.g., over 32-bits in length).

Figure 8:
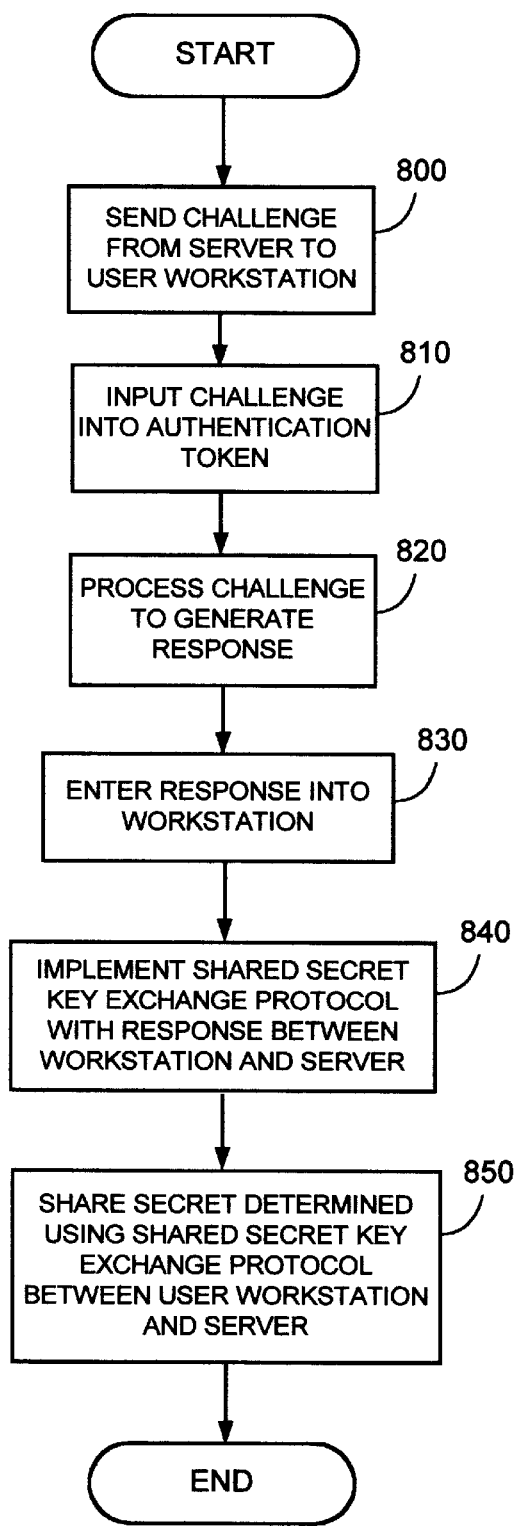
FIG. 8 illustrates a method for establishing a shared secret using a challenge-response authentication token and shared secret key exchange protocol consistent with the present invention.

FIG. 8 illustrates a method for establishing a shared secret with a challenge-response authentication token and shared secret key exchange protocol consistent with the present invention. Initially, server 130 sends a challenge to workstation 120 (step 800). Upon receipt, the user enters the challenge into a challenge-response authentication token (step 810), perhaps with a PIN. The authentication token then processes the entered challenge and generates a response (step 820). The user enters the response into workstation 120 (step 830) where it is used to conduct a shared secret key exchange protocol (step 840). Both workstation 120 and server 130 use the secret determined by the key exchange as a shared secret (step 850). Alternatively, a function of the response (e.g., a hash of the response with another PIN) can be used in the key exchange to further enhance authentication between workstation 120 and server 130.

Figure 9A:
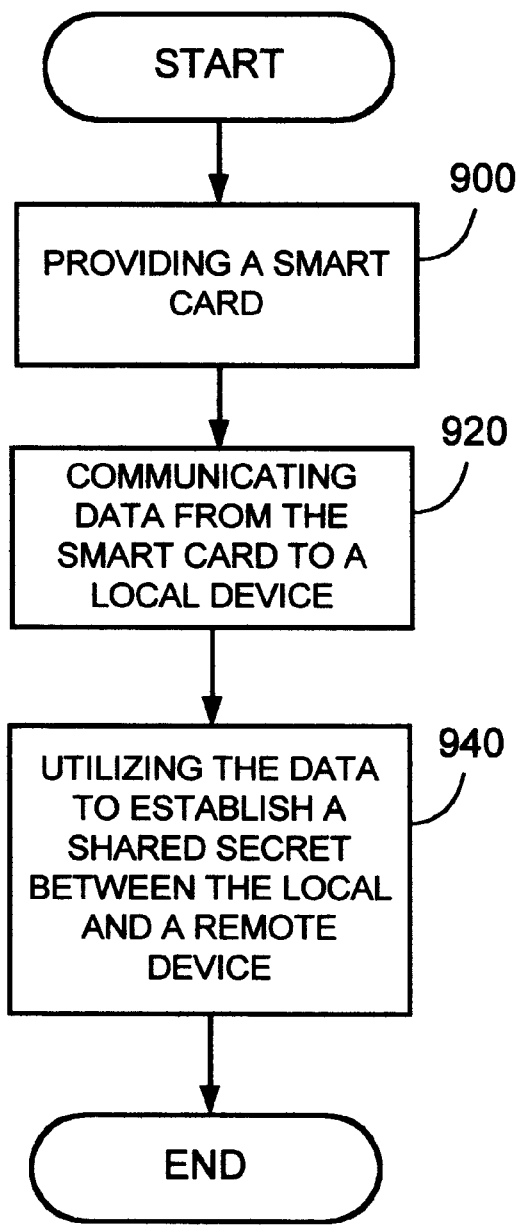
FIG. 9a illustrates a method for establishing a shared secret between a local device and a remote device using a smart card consistent with the present invention.
Figure 9B:
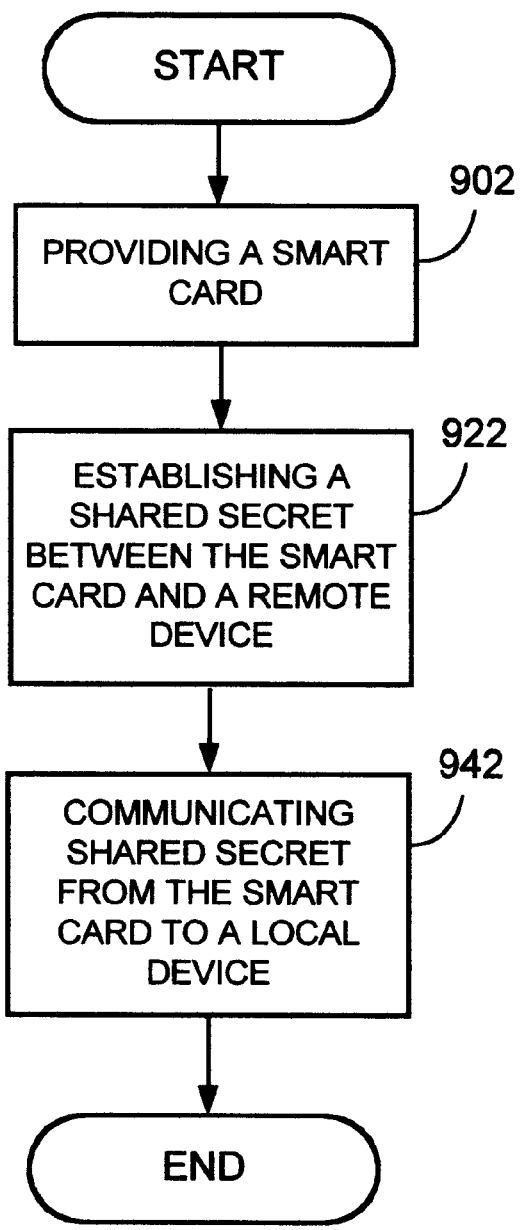
FIG. 9b illustrates a method for establishing a shared secret between a smart card and a remote device and sharing the secret with a local device.
Figure 9C:
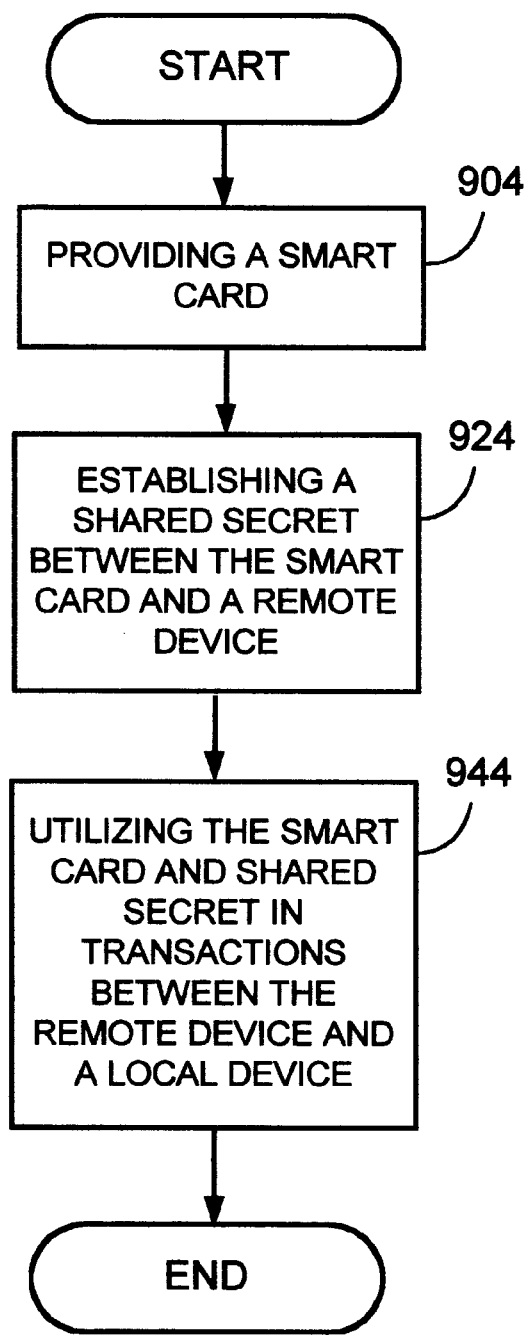
FIG. 9c illustrates a method for establishing a shared secret between a smart card and a remote device and using the smart card for transactions between the remote device and a local device.

FIGS. 9a–9c illustrate methods for establishing a shared secret using a smart card consistent with the present invention. In particular, FIG. 9a illustrates a method for establishing a shared secret between a local device and a remote device using a smart card consistent with the present invention. The method begins with providing a smart card (step 900). The smart card may be activated using an activation code. The activation code can include a PIN, a biometric, or other form of input. In addition, the smart card may have an internal clock for processing data or operate using an external clock (e.g., the workstation clock). Once activated, the card communicates data (e.g., a character string) to a local device, such as a workstation (step 920). The workstation may be configured to receive the data through a card reader or directly using an internal receiver and appropriate software.

Upon receiving the data, the workstation can utilize it to establish a shared secret with a remote device, such as a server, using any one of the techniques described above with regard to the time-synchronized and challenge-response authentication tokens (step 940). For example, the workstation can generate a first character string and communicate it to a remote device where it is matched with one of a plurality of acceptable values. A shared secret can also be established by communicating a first character string from a remote device to the workstation and processing the first character string on the workstation to generate a second character string that can be used as a shared secret. The shared secret can then be used for user authentication, data encryption, and integrity protection.

FIG. 9b illustrates a method for establishing a shared secret between a smart card and a remote device and sharing the secret with a local device. This method begins with providing a smart card (step 902). The smart card may be activated and use an internal or external clock as described above with respect to FIG. 9a. Moreover, the smart card may include communication software and hardware to facilitate communication with a remote device. To this end, the smart card is capable of establishing a shared secret with the remote device using one or more of the foregoing techniques (i.e., the smart card can operate as an authentication token and workstation to establish a shared secret with a remote server) (step 922). For example, the smart card can generate a first character string and communicate it to a remote device where it is matched with one of a plurality of acceptable values. A shared secret can also be established by communicating a first character string from a remote device to the smart card and processing the first character string on the smart card to generate a second character string that can be used as a shared secret. The smart card can then communicate the shared secret to the workstation for user authentication, data encryption, and integrity protection (step 942).

FIG. 9c illustrates a method for establishing a shared secret between a smart card and a remote device and using the smart card for transactions between the remote device and a local device. This method begins with providing a smart card (step 904). The smart card may be activated and use an internal or external clock as described above with respect to FIG. 9a. Moreover, the smart card may include communication software and hardware to facilitate communications with a remote device. To this end, the smart card is capable of establishing a shared secret with the remote device using one or more of the foregoing techniques (step 924). This method differs from that described with reference to FIG. 9b in that once a shared secret is established, the smart card does not communicate it to the workstation. That is, the smart card and shared secret are utilized in transactions between the remote device and the local device without ever revealing the shared secret to the local device (step 944).

Embodiments consistent with the present invention provide adequate authentication and enhance the integrity of information transferred between parties over a communication medium. The authentication techniques described herein allow a user to customize their level of authentication based on the type of token used and the available software on the workstation and server. For example, both the workstation and server may only have hashing and encryption software. However, with only these two types of software and an authentication token, the workstation and server are capable of providing sophisticated levels of authentication using the foregoing techniques.

While there has been illustrated and described preferred embodiments and methods of the present invention, those skilled in the art will understand that various changes and modifications may be made, and equivalents may be substituted for elements thereof, without departing from the true scope of the invention.

In addition, many modifications may be made to adapt a particular element, technique or implementation to the teachings of the present invention without departing from the central scope of the invention. Therefore, this invention should not be limited to the particular embodiments and methods disclosed herein, but should include all embodiments falling within the scope of the appended claims.

What is claimed is:

1. A method for establishing a shared secret among a plurality of devices, comprising the steps of:
   providing an authentication token;
   generating a first character string on the authentication token;
   communicating the first character string to a local device;
   creating a second character string from the first character string on the local device;
   sending the second character string to a remote device;
   disambiguating the second character string from a plurality of predicted character string values; and
   utilizing at least one of the plurality of predicted character string values to establish a shared secret between the local device and the remote device.

2. The method of claim 1 further comprising the step of implementing a shared secret key exchange protocol using the first character string to establish a shared secret with the remote device.

3. The method of claim 2 wherein the implementing step includes the steps of:
   disambiguating the first character string from a plurality of predicted character string values; and
   implementing the shared secret key exchange protocol after the first character string is disambiguated.

4. The method of claim 2 wherein the implementing step includes the steps of:
   disambiguating the first character string from a plurality of predicted character string values; and
   implementing the shared secret key exchange protocol while the first character string is disambiguated.

5. The method of claim 2 wherein the implementing step includes the steps of:
   implementing the shared secret key exchange protocol; and
   disambiguating the first character string from a plurality of predicted character string values after the shared secret key exchange protocol is implemented.

6. The method of claim 2 wherein the implementing step includes the step of implementing a shared secret key exchange protocol using the first character string and a personal identification number to establish a shared secret with the remote device.

7. The method of claim 1 wherein the creating step includes the step of implementing a function of the first character string to generate the second character string.

8. The method of claim I wherein the providing step includes the step of providing a smart card.

9. The method of claim 1 further comprising the steps of proving to the remote device that the local device has the shared secret.

10. The method of claim 9 wherein the proving step includes the steps of:
    communicating a third character string from the remote device to the local device;
    implementing a function on the local device using at least one of the shared secret and the third character string to produce an output;
    sending the output to the remote device; and
    comparing the output with a predicted character string value to prove that the local device has the shared secret.

11. The method of claim 1 further comprising the step of proving to the local device that the remote device has the shared secret.

12. The method of claim 11 wherein the proving step includes the steps of:
    communicating a third character string from the local device to the remote device;
    implementing a function on the remote device using at least one of the shared secret and the third character string to produce an output;
    sending the output to the local device; and
    comparing the output with a predicted character string value to prove that the remote device has the shared secret.

13. The method of claim 1 wherein the creating step includes the step of creating the second character string using the first character string and a personal identification number.

14. The method of claim 1 wherein the creating step includes the step of implementing a hash function to create the second character string from the first character string.

15. The method of claim 1 wherein the sending step includes the step of sending only a portion of the second character string to the remote device.

16. The method of claim 1 further comprising the step of communicating an instruction from the remote device to the local device for information required to disambiguate the second character string from the at least one of a plurality of predicted character string values.

17. The method of claim 16 further comprising the step of generating an output value on the workstation, in response to the instruction, used to disambiguate the second character string from the at least one of a plurality of predicted character string values.

18. The method of claim 1 further comprising the step of activating the authentication token with an activation code.

19. The method of claim 1 wherein the providing step includes the step of providing an authentication token that is approximately time-synchronized with at least one of the plurality of devices.

20. A method for establishing a shared secret among a plurality of devices, comprising the steps of:
    providing an authentication token;
    communicating a first character string from a remote device to the authentication token;
    processing the first character string using the authentication token to generate a second character string;
    sending the second character string to a local device; and
    utilizing the second character string to establish a shared secret with a remote device.

21. The method of claim 20 further comprising the step of activating the authentication token with an activation code.

22. The method of claim 20 wherein the sending step includes the step of communicating a personal identification number along with the second character string to the local device.

23. The method of claim 20 wherein the utilizing step includes the step of implementing a shared secret key exchange protocol with the second character string to establish a shared secret.

24. The method of claim 20 wherein the utilizing step includes the step of implementing a shared secret key exchange protocol with the second character string and a personal identification number to establish a shared secret.

25. A method for establishing a shared secret among a plurality of devices, comprising the steps of:
    providing an authentication token; and
    utilizing the authentication token to establish a shared secret among the plurality of devices.

26. The method of claim 25 wherein the providing step includes the step of providing a smart card.

27. A system for establishing a shared secret among a plurality of devices, comprising:

an authentication token;

a local device; and a remote device, wherein the authentication token is used to establish a shared secret between the local device and the remote device.

28. The system of claim 27 wherein the authentication token is approximately time-synchronized with the remote device.

29. The system of claim 27 wherein the authentication token includes a processor.

30. The system of claim 27 wherein the authentication token is configured to receive an input.

31. The system of claim 27 wherein the authentication token is configured to produce an output.

32. The system of claim 27 wherein the authentication token includes a display.

33. The system of claim 32 wherein the authentication token includes means for generating a character string viewable on the display.

34. The system of claim 27 wherein the local device is a workstation.

35. The system of claim 27 wherein the remote device is a server.

36. The system of claim 27 wherein the authentication token is a smart card.

37. A system for establishing a shared secret among a plurality of devices, comprising:

a local device;

a remote device;

an authentication token;

means for generating a first character string on the authentication token;

means for communicating the first character string to the local device;

means for manipulating the first character string using a predetermined function to generate a second character string;

means for sending the second character string to the remote device; and means for matching the second character string with at least one of a plurality of predicted character string values to establish a shared secret between the local device and the remote device.

38. The system of claim 37 wherein the authentication token is an approximate time-synchronized token.

39. The system of claim 37 wherein the manipulating means include means for executing a hash function using the first character string as an input to produce the second character string.

40. The system of claim 37 wherein the manipulating means include means for executing a hash function using the first character string and a personal identification number as an input to produce the second character string.

41. The system of claim 37 further comprising means for implementing a shared secret key exchange protocol using the first character string to produce a shared secret.

42. The system of claim 41 wherein the implementing means includes means for implementing a shared secret key exchange protocol using the first character string and a personal identification number to produce a shared secret.

43. The system of claim 37 wherein the sending means include means for sending less than a total number of bits of the second character string to the remote device.

44. The system of claim 37 further comprising means for transferring an instruction from the remote device to the local device for information required to disambiguate the second character string from the at least one of a plurality of predicted character string values.

45. The system of claim 44 wherein the transferring means include means for providing a constant with the instruction from the remote device to the local device that is processed with the second character string using a hash algorithm.

46. The system of claim 37 wherein the generating means includes means for activating the authentication token with an activation code.

47. A system for establishing a shared secret among a plurality of devices, comprising:

a local device;

a remote device;

an authentication token;

means for determining a first character string using the remote device;

means for sending the first character string to the authentication token;

means for processing the first character string to produce a second character string; and means for communicating the second character string into the local device such that the remote device and the local device share the second character string as a secret.

48. The system of claim 47 wherein the authentication token is a challenge-response token.

49. The system of claim 47 further comprising means for entering an activation code into the authentication token.

50. The system of claim 47 further comprising means for entering a personal identification number into the local device.

51. The system of claim 47 further comprising means for implementing a shared secret key exchange protocol using the second character string.

52. A method for establishing a shared secret among a plurality of devices, comprising the steps of:

providing a smart card;

communicating data from the smart card to a local device; and utilizing the data to establish a shared secret between the local device and a remote device.

53. The method of claim 52 further comprising the step of activating the smart card with an activation code.

54. The method of claim 53 wherein the activation code is a personal identification number.

55. The method of claim 53 wherein the activation code is a biometric.

56. The method of claim 52 wherein the providing step includes the step of providing a smart card with an internal clock.

57. The method of claim 52 wherein the providing step includes the step of providing a smart card that utilizes an external clock.

58. A method for establishing a shared secret among a plurality of devices, comprising the steps of:

providing a smart card;

establishing a shared secret between the smart card and a remote device; and communicating the shared secret from the smart card to a local device to establish the shared secret between the local device, smart card, and remote device.

59. The method of claim 58 wherein the establishing step includes the steps of:

generating a first character string on the smart card;

communicating the first character string to the remote device; and utilizing the first character string to establish a shared secret with the remote device.

60. The method of claim 58 wherein the establishing step includes the steps of:

communicating a first character string from the remote device to the smart card; and processing the first character string on the smart card to generate a second character string used to establish a shared secret.

61. The method of claim 58 further comprising the step of activating the smart card with an activation code.

62. The method of claim 61 wherein the activation code is a personal identification number.

63. The method of claim 61 wherein the activation code is a biometric.

64. The method of claim 58 wherein the providing step includes the step of providing a smart card with an internal clock.

65. The method of claim 58 wherein the providing step includes the step of providing a smart card that utilizes an external clock.

66. A method for establishing a shared secret among a plurality of devices, comprising the steps of:

providing a smart card;

establishing a shared secret between the smart card and a remote device; and utilizing the smart card and the shared secret in transactions between the remote device and a local device.

67. The method of claim 66 wherein the establishing step includes the steps of:

generating a first character string on the smart card;

communicating the first character string to the remote device; and utilizing the first character string to establish a shared secret with the remote device.

68. The method of claim 66 wherein the establishing step includes the steps of:

communicating a first character string from the remote device to the smart card; and processing the first character string on the smart card to generate a second character string used to establish a shared secret.

69. The method of claim 66 further comprising the step of activating the smart card with an activation code.

70. The method of claim 69 wherein the activation code is a personal identification number.

71. The method of claim 69 wherein the activation code is a biometric.

72. The method of claim 66 wherein the providing step includes the step of providing a smart card with an internal clock.

73. The method of claim 66 wherein the providing step includes the step of providing a smart card that utilizes an external clock.

* * * * *